April 25, 1944.   H. E. TAUTZ   2,347,223
CUTTING MACHINE
Filed Oct. 3, 1941   3 Sheets-Sheet 3

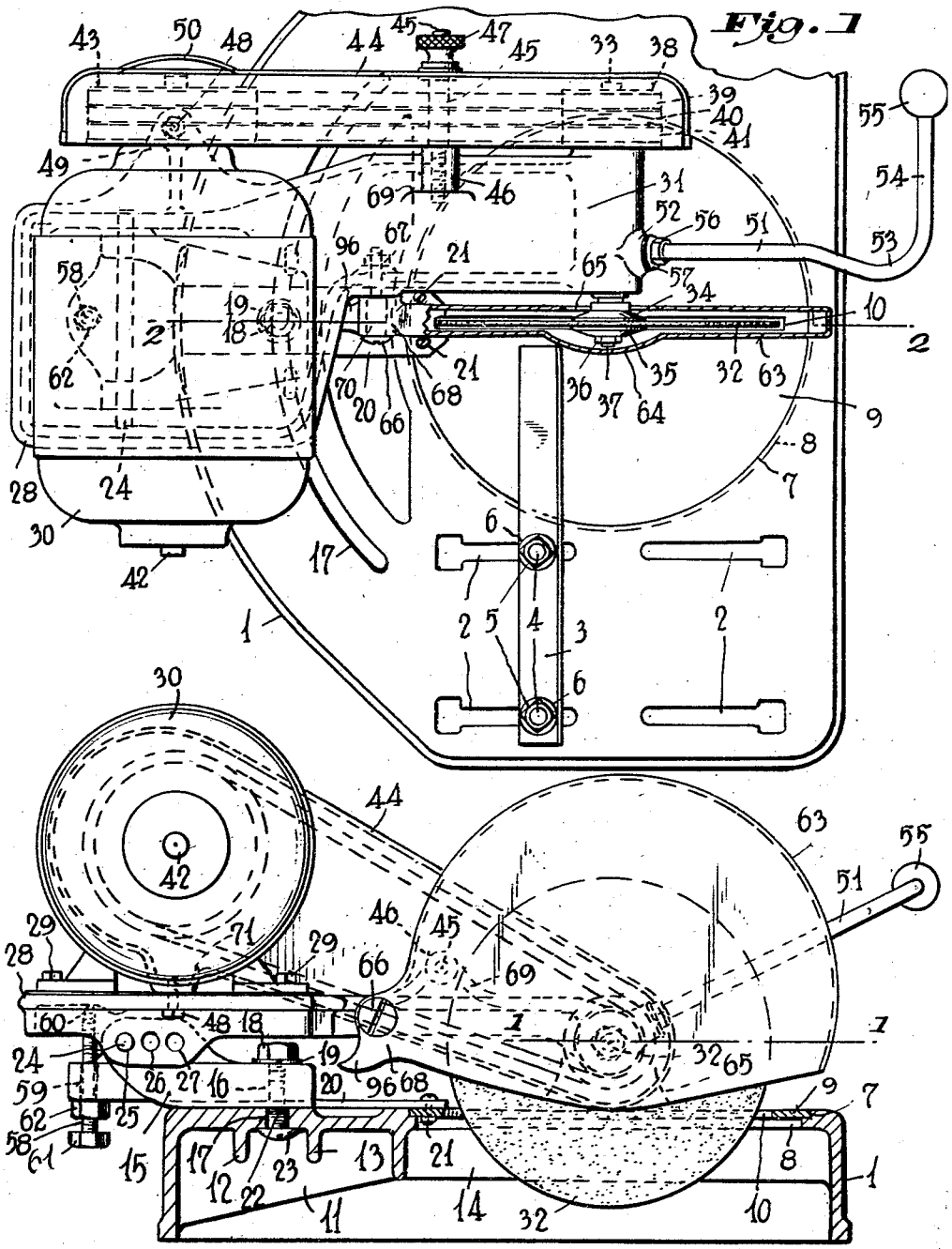

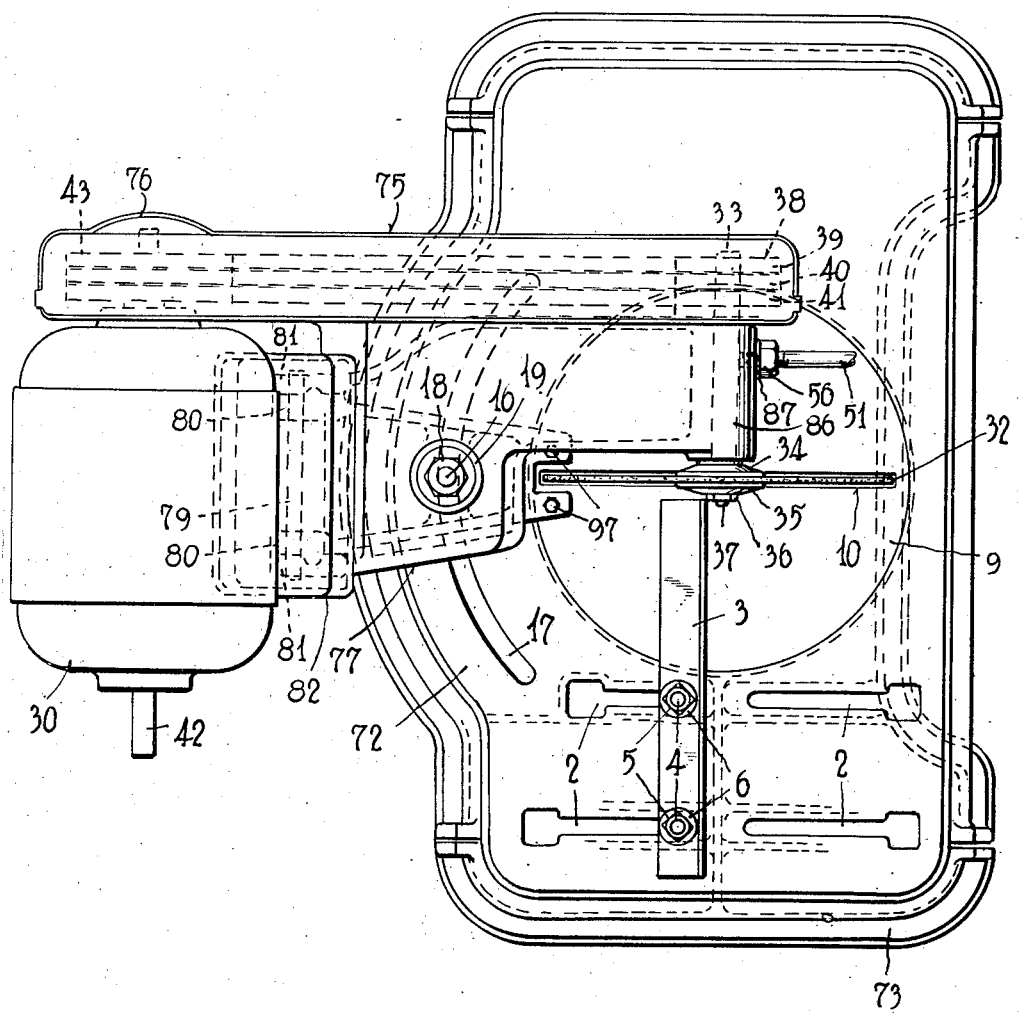

INVENTOR.
Herbert E. Tautz,
BY
Carl A. Hellmann,
Attorney

Patented Apr. 25, 1944

2,347,223

UNITED STATES PATENT OFFICE 2,347,223

CUTTING MACHINE

Herbert E. Tautz, Englewood, Colo., assignor, by mesne assignments, to Delta Manufacturing Company, Milwaukee, Wis., a partnership consisting of Marshall Field, Charles G. Cushing, and H. Campbell Stuckeman Application October 3, 1941, Serial No. 413,544

6 Claims. (Cl. 51—98)

The present invention relates to a device for cutting materials by means of a rotary cutter which for example may be a metal disk having teeth at its periphery, or a disk of abrasive material, the former being particularly suitable for cutting wood and other materials having somewhat similar characteristics, while the abrasive wheel is suitable primarily for cutting metals and other substances which cannot be cut advantageously by means of toothed metallic cutters rotating at high speed.

The invention has for its object to provide a compact and sturdy machine, for receiving the material to be cut and subjecting it to the action of a rapidly rotating cutter which is approached to the material from above and cuts vertically downward therethrough, the said material being held substantially motionless and supported upon a table, and in certain cases also resting against a suitable guide fence cooperating with said table.

In one form of the invention the machine comprises a base carrying a rotatably-mounted insert, said insert and table supporting the cutter mechanism and its source of power, such as a motor and belting, whereby it becomes possible to cut the material at any angle within the range of the machine by turning the insert to a corresponding extent, while the workpiece being cut is maintained against the table and the substantially stationary fence carried thereby.

A further object of the invention is to provide a frame adapted to carry a motor at one end and a shaft or spindle for the cutting tool at the other end, suitable pulleys and belts being provided to connect the cutter spindle or shaft with the shaft of the motor.

In one form of the invention the base of the machine is intended to be supported on the top of an existing table or work bench. In this form means are provided for supporting a frame, carrying the motor and the tool spindle, to pivot about a selected axis, so that the weight of the motor will more nearly counterbalance the weight of the cutter spindle, etc. For this purpose, a number of alined bores is provided in the motor mounting plate, cooperating with corresponding bores in a mounting bracket which is attached rigidly to the table insert, whereby a pivot shaft may be inserted in those holes which best counterbalance said parts.

In another form of the machine a slightly altered construction is employed, wherein the motor mounting plate has studs projecting therefrom on the side opposite to the motor-receiving surface, said studs extending into corresponding holes in the frame, thus providing means whereby the motor may be adjusted toward or from its mounting plate, which is of particular value in facilitating the proper tensioning of the drive belt or belts.

This second type of machine is herein disclosed as mounted upon a stand particularly adapted to receive it, so as to form an independent machine, complete in itself, which may be mounted anywhere upon the floor of the work shop.

This stand or casing may be so shaped as to afford room for the knee or knees of the operator, thus enabling him to approach more closely to the machine.

While the characteristics of these two types of the machine are described above as combined in certain definite ways, it should be understood clearly that these features may be varied and/or interchanged if desired.

In either form of machine a guard for the cutter is provided, whereby the cutter may move substantially vertically while the operator is protected against contact with the rapidly rotating cutting tool. This guard either may be mounted to move with the cutting tool, or may be mounted rigidly on the insert, so as to turn therewith.

Other objects and advantages of the invention in part will be pointed out in the following specification, in connection with the drawings accompanying the same, and in part will be obvious from the structures disclosed.

In said drawings, illustrative of the invention:

Fig. 1 is a partly sectional plan view of one form of the invention, the base being partly broken away and the guard for the cutter being shown in section, on the horizontal plane indicated by the line 1—1 of Fig. 2;

Fig. 2 is a partly sectional elevation of the machine, the section being made of the plane indicated by the line 2—2 of Fig. 1;

Fig. 3 is a plan view of a modified form of the machine, mounted upon a stand or casing, the cutter guard being omitted.

In all the figures corresponding elements are designated by similar reference characters.

Figure 4:
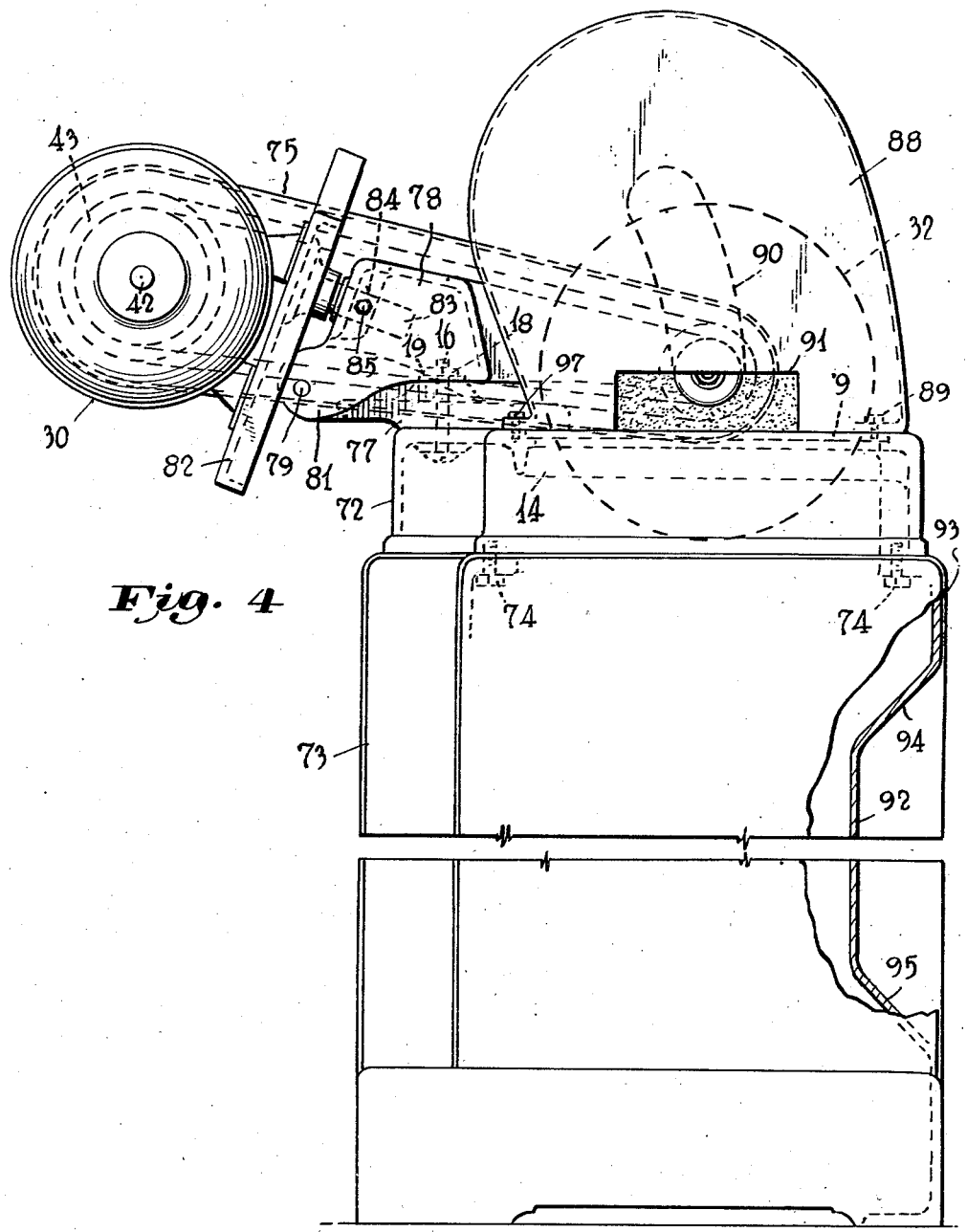
Fig. 4 is a side elevation thereof, the stand being partly broken away and partly in section to show the space provided for the operator's knee.

Referring first to the form shown in Figs. 1 and 2, the machine comprises a base 1 upon which the movable parts are mounted, said base being intended primarily for use with a table or work bench, upon which it may rest.

This base has a number of T-slots 2 therein for use in holding a work-guiding fence 3, secured thereto by bolts 4 passing through a pair of the slots, nuts 5 being threaded thereon and washers 6 interposed as shown. The base has a circular cutout 7 therein, with an inwardly extending flange 8, as shown clearly in Fig. 2, this opening being closed by a correspondingly sized insert 9 shown in Fig. 1. This insert has a slot 10 therein, extending substantially diametrically thereof, but terminating short of the periphery of the insert as shown.

The base 1 has stiffening ribs such as 11, 12, 13 and 14 therein, to provide adequate strength without undue weight. A bracket 15 is secured to the base 1 by means of the bolt 16, having a flattened or squared portion 22 adjacent its head 23, passing through an arcuate slot 17 concentric with the opening 7, a nut 18 and washer 19 being provided to cooperate with said bolt 16. This bracket has a tongue 20 extending therefrom and secured to the insert 9 by the screws or bolts 21, so that the bracket 15 will turn as a unit with the insert 9, about a vertical axis passing through the center of the insert.

The bracket 15 has a number of holes therein to receive the pivot pin 24, three such holes being here located immediately behind the corresponding holes 25, 26 and 27 formed in the motor mounting plate 28. The pin 24 may be inserted through any one of the sets of holes, so as to change the horizontal axis about which the motor and the mechanism driven thereby may pivot during the cutting operation, as will be described hereinafter. A motor such as 30 may be mounted on the plate 28, and secured by fastenings such as the bolts 29.

The plate 28 has a forwardly extending arm 31, here shown as offset to the right and serving to carry the cutting tool, illustrated as an abrasive disk 32, mounted upon the shaft 33, journalled in suitable bearings near the forward end of the arm 31. The shaft 33 has a flange 34 bearing against one side of the tool 32, and a cupped washer 35 bearing against the other side thereof, a nut 36 being mounted on the threaded end 37 of the shaft to secure the tool removably to said shaft.

This offsetting of the arm 31 has the advantage that the motor 30 is mounted more nearly symmetrically with respect to the plane of the cutter 32, thus distributing the weight of the motor uniformly and preventing the tendency of the cutter to tilt that would otherwise exist in case any looseness develops or exists in the pin joint at 25, 26, or 27. This also makes the manipulation of the machine smoother and more stable.

At the other end the shaft carries a pulley 38, here shown as having three grooves to receive the belts 39, 40, and 41. It will be understood however that although multiple belts are preferred, it is possible to use any desired number of belts, the term "number" being used in the present specification and claims in its broader mathematical sense, to designate any positive whole number, inclusive of unity.

The motor shaft 42 carries a pulley 43, with a number of grooves corresponding to those on the pulley 38, to receive the belt or belts. A guard casing 44 covers the pulleys and connecting belting as shown, and may be secured to the arm 31 by means of a stud 45 passing through the spacing collar 46 and having its inner end threaded into a lug 69 on the arm 31, a knurled nut 47 being threaded upon the outer end of said stud to hold the casing 44 removably but firmly in place. Another fastening is provided at 48 to secure the guard 44 against turning about the axis of the stud 45, the fastening screw 48 securing an offset portion 71 of the guard to a projection 49 extending from the plate 28. The guard 44 may have a bulge, such as shown at 50, to accommodate the free end of the shaft 42.

From the structure so far described, it will be seen that the plate 28 and the arm 31 carried thereby may oscillate about the pivot pin 24, carrying along the motor 30 and the cutter 32 together with the connecting belts and belt guard, etc. In order to impart this motion, a suitable handle is provided by screwing a rod 51 into a threaded bore in the lug 52 formed on the arm 31. The rod 51 may be bent as shown at 53, to provide a handle portion 54 extending substantially parallel to the pivot rod 24, and terminating in a ball 55. In order to make it possible to secure the handle 54 in the desired position, a nut 56 may be threaded upon the inner end of rod 51, with a lock washer 57 interposed between said nut and the outer surface of the lug 52.

A stop screw 58 is threaded through a bore 59 in the bracket 15 and extends upwardly, with its upper end 60 below the under surface of the mounting plate 28, so that when the said plate is pivoted about the rod 24 by lifting the handle 54, the end 60 of the screw eventually will abut against the bottom of the said plate 28 and limit the same against further raising. The position of said end may be adjusted by turning the screw 58 by means of its head 61, whereupon it may be locked in position by the nut 62, it being understood that when pivot 24 is moved into a new opening (25, 26 or 27) the stop must be readjusted to stop the plate in the proper position.

In order to provide protection for the operator of the machine, a guard 63 is mounted over the cutter 32. This guard is here shown as a comparatively narrow casing open at the bottom, and domed at 64 to accommodate the end 37 of the shaft 33. Opposite the dome there is a U-shaped cutout 65, to permit pushing the guard down over the shaft 33 and flange 34, with the cutting tool 32 in place. The guard 63 is mounted to move with the arm 31 by securing it thereto by means of the screw 66, which passes through a fitting 68 secured to the guard, and a nut 67 threaded on said screw, the screw having an enlarged portion 70 forming a pivot for the guard fitting 68.

The guard 63 has a finger 96 at its lower rear end which will engage a portion of the motor support 28, when the said support rises pivotally upward about the axis of the pin 24, upon lifting the cutter 32 by means of the handle 54. It will be noted that up to the time that this finger comes into contact with the motor support the guard 63 will drop freely over the cutter 32, by turning about the axis of the screw 66, that is, the said guard will remain in contact with the insert 9 up to this time.

If the guard were to drop further it might strike the cutter 32, and in order to prevent this the finger 96 will stop automatically any further independent movement of the guard 63 when this position is reached, and thereafter further lifting motion of the handle will cause the guard 63 to be carried along upward, by turning about the axis of the pin 24. This also provides a clear opening below the guard for inserting the workpiece when the cutter is raised sufficiently, while at the same time the guard covers the cutter more fully whenever the latter is raised, thus increasing the safety of the operator.

Referring now to Figs. 3 and 4, a slightly modified form of cutting machine is illustrated. This machine is adapted particularly to be mounted upon an individual support or casing and has a base 72 mounted upon the stand or casing 73 and secured thereto by bolts 74, as shown best in Fig. 4.

This base 72 is in many respects similar to the base 1 of the preceding form, and is provided with a similar circular cutout, which will receive an insert 9 identical with that previously described, having the slot 10 to receive the cutter 32 which is mounted upon the threaded end 37 of the shaft 33, between the flange 34 secured to the shaft and the cupped washer 35 held by the nut 36. The base 72 has therein the T-shaped slots 2, for holding the work-guiding fence 3 by means of bolts 4, nuts 5, and washers 6, as in the previously described form of device, and also has the arcuate slot 17 concentric with the insert 9, for cooperation with the bolt 16, nut 18 and washer 19 for clamping the mechanism in its desired position, as in the form disclosed in Fig. 2.

A pulley is mounted upon the other end of the shaft 33, and grooved to receive any desired number of belts, 39, 40 and 41 for example, which pass also over the pulley 43 carried by the shaft 42 of the motor 30. A guard casing 75 may be provided to cover the pulleys and the belt or belts connecting them, and preferably has a bulge or dome 76 adjacent the end of the motor shaft to accommodate any unduly projecting length thereof, if needed.

A bracket 77 is secured to the insert 9, for example by means of the cap screws 97, so that the bracket may turn with the insert when the bolt 16 is loosened by releasing the nut 18, whereupon the bracket 77 may be turned about a vertical axis passing through the center of the insert 9, and then secured in any position, within the limits imposed by the length of the arcuate slot 17.

A second bracket 78 is mounted hingedly on the first bracket 77 by means of a horizontal pin 79, which extends through the ears 80, 80 of the bracket 77 and the ears 81, 81 of the bracket 78, lying just outside the ears on the bracket 77. This affords two widely spaced pivots for the brackets 78, whereby it is guided to move accurately.

A motor mounting plate 82 is carried by the bracket 78, by means of studs or pins 83 secured to said plate and slidable in bores 84 in the bracket 78, whereby the belt or belts may be tightened to the desired tension, whereupon the studs 83 may be secured in any desired way, as by the cap screws 85 carried by the bracket 78.

The bracket 77 has a forwardly extending portion 86 in which the shaft 33 is journalled, and which also provides means for attaching the operating handle 51, which is threaded into the lug 87, and provided with a lock nut 56 to hold said handle in the desired position, as in Fig. 1.

A guard 88 is provided for protecting the operator against contact with the cutter 32, but this guard differs from the one disclosed in Figs. 1 and 2 in that it is attached rigidly to the insert 9, for example by the cap screws 89, so that it will turn with the insert, but will not rise and fall with the cutter. Accordingly the guard 88 must be of sufficient height to accommodate the cutter 32 throughout its entire range of pivotal movement about the pin or shaft 79.

Inasmuch as the shaft 33 and the flange 34 carried thereby extend out through the guard 88 on the side toward the pulley 38, it is desirable to provide a substantially arcuate slot 90 to accommodate these parts in the swinging movement of the mechanism, and it will be noted that the slot 90 is made concentric with the axis of the pivot pin 79, to accomplish this. It is also necessary to provide an opening to receive the work piece or stock being cut, and this is here shown as a substantially rectangular opening 91, of sufficient height and width to receive the material designed to be cut by the machine. In order to avoid obscuring the cutter and associated parts, this guard is not shown in Fig. 3.

While the guard 88 does not swing with the cutting mechanism, the belt guard 75, on the contrary, is secured to and supported by the bracket 78, so as to tilt with the motor and the mechanism actuated thereby.

A few words regarding the stand 73 will serve to explain some of the chief characteristics thereof. In general, this stand embodies certain of the features disclosed in the present inventor's co-pending case, Serial Number 377,243, filed February 3, 1941, for Stands for motor-driven tools and the like, that is, it is built up of separate panels which are connected by screws or bolts as disclosed in said co-pending case.

The important difference between this present casing and the one previously disclosed however, is that the present stand provides an inwardly-displaced portion 92 in the front wall 93, produced by means of a sloping wall 94 above the portion 92 and another sloping wall 95 below the same, as shown in Fig. 4. This permits the operator to be seated closer to the front of the machine, by providing room for his knee or knees, thus facilitating access to the device.

The operation of the machine will presumably be clear from the structural features thereof, and may be summarized briefly as follows:

Assuming that a piece of stock is to be cut off by the machine shown in Figs. 1 and 2, the fence 3 may be placed on top of the base 1, preferably extending partly across the insert 9 as illustrated, to guide the work-piece at the proper angle to the cutter 32, a right angle cut being provided by the set-up indicated in Fig. 1. The fence 3 may be adjusted to the proper location by moving it forward or back along the slots 2 to suit the dimensions of the material being cut, but preferably will be placed in such position that the portion of the stock most remote from the guiding surface of the fence will be cut through last, thereby preventing binding of the cutter in the cut.

The cut is made by bringing the rapidly rotating cutter 32 down upon the workpiece by pulling or pushing the handle or lever 51 down until the cutter has severed the stock. The bent portion 54 and knob 55 facilitate actuation of said lever 51 and are within easy reach of the right hand of the operator, whose left hand is available to hold the stock against the fence 3 during the cutting operation.

In case it is desired to cut the stock at another angle, this may be done by clamping the fence 3 to the base 1 at the proper angle by means of the slots 2, but preferably will be accomplished by tilting the cutting tool 32 about the vertical axis of the insert 9, by turning the entire assembly of motor and cutter etc. about said axis, after loosening the nut 18, whereupon the mechanism may be clamped to hold the cutter at the desired angle to the guiding surface of the fence 3.

In thus adjusting the angle of cut it is obvious that all the parts will turn with the insert 9, so that the mechanism will maintain the cutter 32 in proper alinement with the slot 10 and will also maintain the guard 63 in proper position with respect to the cutter blade 32 protected thereby.

The cutter 32 will penetrate well below the top surface of the base 1, when in its lowermost position, and therefore the depth of the base 1 should be made sufficient to accommodate the entire useful cutting depth of the said cutter 32. It will also be noted that the base 1 will prevent any contact of the operator's hands with the wheel or other cutter when such wheel projects below the insert 9, so that no lower guard is necessary.

Inasmuch as the motor 30 usually is much heavier than the cutter blade or wheel 32 and the mechanism immediately associated therewith, it is obvious that in order to counterbalance the cutting mechanism properly, the pivot 24 will be located much nearer to the motor than to the cutter. To make it easier to manipulate the mechanism by means of the handle 51, it is desirable to provide a certain amount of choice of the degree of counterbalancing of the weight, and this is accomplished by providing a series of interchangeable locations for the pivot pin 24, as already described.

In order to limit the upward motion of the cutter, the screw 58 is adjusted into such position that its upper end 60 will come into contact with the under surface of the motor mounting plate 28 when the cutter 32 has been raised sufficiently high properly to clear the stock being cut. The lower limit of movement may be provided for instance by the contact of the guard 63 with the insert 9, after said guard has turned sufficiently to cause both the finger 90 and the lower edge of the guard to rest on the base and insert respectively, or in any other way.

While the machine just described is readily portable and is of relatively low weight so that it may be placed where wanted on a work bench or table, the machine disclosed in Figs. 3 and 4 is advantageous in that it provides an entirely self-contained device which does not need an existing table or work bench, but may stand directly upon the floor. This form necessarily is somewhat less readily portable because of the additional weight of the stand.

The operation however is substantially the same as that of the preceding form, with the exception that the cutter guard 88 does not move up and down with the cutter 32 but remains rigidly connected with the insert 9. This affords somewhat better protection for the operator, inasmuch as practically the entire cutter is guarded, in contradistinction to the other form, wherein the guard 63 leaves the under portion of the cutter 32 exposed when raised from the work.

The motor may be moved toward and from the shaft of the cutter by sliding the studs 83 on the mounting plate 82 into or out of the bores 84 in the bracket 78, so as to adjust the belt tension properly.

The inward bulge in the front panel of the stand 73 provided by the inwardly-offset wall 92 provides room for the knee or knees of the operator when seated closely in front of the machine, and yet does not decrease the strength of the panel. The casing 73 of course also prevents any contact of any part of the operator's body with the cutter, since there is no opening leading to the underside of the base 72 of sufficient size to admit a hand or knee of the operative.

While for purposes of illustration two distinct forms of the machine have been disclosed herein, it should not be assumed that these forms are essentially separate types, because it is readily possible to incorporate many of the features disclosed in either type into the other. For example, the Fig. 1 machine may equally well have cutter guard such as 88 in place of the guard 63 which rises and falls, the Fig. 4 machine need not be mounted on a specially designed casing such as 73, but on the contrary its base 72 may be mounted or set upon a work bench and the counterbalancing provisions disclosed in Fig. 2 may be incorporated into Fig. 4, or vice-versa, the belt tension adjustment feature of the motor mounting plate 82 may be applied in place of the plate 28 in the Fig. 1 form.

Therefore, although the machines disclosed represent instances of two preferred forms of mechanism embodying the invention, the said invention is not to be considered as limited to the specific structures disclosed, and is defined solely in and by the following claims.

I claim:

1. A cutting machine comprising a base, said base having a circular opening therein, an insert mounted therein, for rotation about the center of said opening, said insert having a substantially diametrically located slot therethrough, a work guide, means for securing said guide to the base, a bracket resting on said base, means interconnecting the bracket and the insert, whereby said insert will turn with the bracket, means for securing said bracket to the base at will, a frame mounted on said bracket to swing about an axis in a plane substantially perpendicular to the axis of the insert, a motor carried by said frame, a rotatable cutter also carried by said frame, pulleys on said motor and cutter and belting connecting said pulleys to rotate the cutter, and a guard carried by said frame, to house said pulleys and belting, said cutter being adapted to move into and out of said slot upon the swinging of the frame.

2. A cutting machine comprising a base, a turntable mounted thereon for rotation about an axis substantially perpendicular to the base, a bracket, means connecting said bracket to the turntable, to turn therewith, a frame, means comprising a pin for mounting said frame on said bracket to swing about an axis in a plane substantially perpendicular to the axis of the turntable, said pin being shiftable to vary its distance from the axis of the turntable, a motor carried by said frame, and a rotatable cutter also carried by said frame, said motor being operatively connected with said cutter to rotate the same.

3. A cutting machine comprising a base, a slotted turntable mounted thereon for rotation about an axis substantially perpendicular to the base, a bracket, means securing it to the turntable, to turn therewith, a frame mounted on said bracket to swing about an axis in a plane substantially perpendicular to the axis of the turntable, a motor carried by said frame, a rotatable cutter also carried by said frame, means connecting said motor with said cutter to rotate the same, the slot in the turntable receiving the cutter when the latter is lowered, a guard enclosing the top and sides of said cutter, and means for pivotally securing said guard to the frame, whereby the guard may be stopped in its descent upon touching the turntable, or the workpiece thereon while the cutter still is capable of descending further, through the slot.

4. A cutting machine comprising a base, a slotted turntable mounted thereon for rotation about an axis substantially perpendicular to the base, a bracket secured to the turntable, to turn therewith, a frame mounted on said bracket to swing about an axis in a plane substantially perpendicular to the axis of the turntable, a motor carried by said frame, means connecting said motor with said cutter to rotate the same, the slot in the turntable receiving the cutter when the latter is lowered, a guard enclosing the top and sides of said cutter, and means for pivotally securing said guard to the frame, whereby the guard may be stopped in its descent upon touching the turntable, or the workpiece thereon while the cutter still is capable of descending further, through the slot, said guard having also means which prevent it from striking the cutter when the latter is raised, said means including a stop carried by the guard and arranged to strike the frame when the cutter is elevated.

5. A cutting machine, comprising a base, said base having a circular opening therein, an insert mounted in said opening, for rocking movement about the center thereof, said insert having a substantially diametrically located slot therethrough, a bracket resting slidably on said base, means for securing the bracket to the base at will, a frame mounted on the bracket to swing about an axis in a plane substantially perpendicular to the axis of the insert, a motor carried by said frame, a rotatable cutter also carried by the frame, means whereby the motor may rotate the cutter, and means for effecting synchronous rocking of the frame and the insert, for maintaining the cutter slot in registry with the cutter, whereby the cutter is capable of moving into and out of the slot upon swinging of the frame.

6. A cutting machine comprising a base, a slotted turntable mounted thereon for rotation about an axis substantially perpendicular to the base, a bracket movably supported on the base, the turntable being secured to the bracket, to turn therewith, a frame mounted on said bracket to swing about an axis in a plane substantially perpendicular to the axis of the turntable, a motor carried by the frame, means connecting said motor with the cutter to rotate the latter, the slot in the turntable receiving the cutter when the latter is lowered, a guard enclosing the top and sides of said cutter, means for pivotally securing said guard to the frame, whereby the guard may descend with the frame, but will be stopped in its descent upon touching the turntable or the workpiece thereon, while the cutter still is capable of descending further, through the slot, and means including a stop on the guard extending away from the guard, with respect to the means pivotally securing the guard to the frame, said frame having a coacting portion which will engage said stop when the guard drops a predetermined extent with respect to the cutter, and thus will prevent the top of the guard from striking the cutter.

HERBERT E. TAUTZ.